United States Patent

Sum

[19]

[11] Patent Number: 6,141,230
[45] Date of Patent: Oct. 31, 2000

[54] VALLEY-FILL POWER FACTOR CORRECTION CIRCUIT

[75] Inventor: K. Kit Sum, Milpitas, Calif.

[73] Assignee: Broadband Telcom Power, Inc., Santa Ana, Calif.

[21] Appl. No.: 09/114,339

[22] Filed: Jul. 13, 1998

[51] Int. Cl.[7] .................................................. H02M 7/06
[52] U.S. Cl. .............................................. 363/61; 363/44
[58] Field of Search .................................. 363/39, 44–46, 363/59, 60, 61, 84, 125, 126; 323/207, 208

[56] References Cited

U.S. PATENT DOCUMENTS

| | | | |
|---|---|---|---|
| 4,017,785 | 4/1977 | Perper .................................... | 363/37 |
| 4,263,642 | 4/1981 | Simmons et al. .................... | 363/39 X |
| 4,388,561 | 6/1983 | Koshimura et al. ................. | 315/171 |
| 5,519,306 | 5/1996 | Itoh et al. ............................. | 323/207 X |
| 5,532,917 | 7/1996 | Hung .................................... | 323/208 X |
| 5,661,348 | 8/1997 | Brown ................................... | 363/61 X |
| 5,781,427 | 7/1998 | Moreau ................................. | 363/61 |

OTHER PUBLICATIONS

K. Kit Sum, "Improved Valley–Fill Passive Power Factor Correction Current Shaper Approaches IEC Specification Limits," *PCIM*, Feb. 1998, pp. 42–51.

K. Kit Sum, "Improved Valley–Fill Passive Current Shaper," *Official Proceedings of the Twelfth International Conference*, Sep. 6–12, 1997, pp. 43–50.

Spangler et al., "Electronic Fluorescent Ballast Using a Power Factor Correction Techniques for Loads Greater than 300 Watts," *Sixth Annual Applied Power Electronics Conference and Exposition*, Mar. 10–15, 1991, pp. 393–399.

Spangler, "A Power Factor Corrected, MOSFET, Multiple Output, Flyback Switching Supply," Official Proceedings of The Tenth International Conference, Oct. 22–25, 1985, pp. 19–32.

*Primary Examiner*—Jessica Han
*Attorney, Agent, or Firm*—Kam T. Tam

[57] ABSTRACT

A valley-fill power factor correction circuit includes a rectifying circuit connected to a charge storage circuit. There is a voltage doubler circuit disposed between the rectifying circuit and the charge storage circuit. The voltage doubler circuit performs the function of filling the normally truncated input current waveform. As arranged, the input current waveform can be substantially maintained with less distortion resulting in a Fourier transform in compliance with the IEC specifications. The valley-fill circuit of the invention is capable of achieving a high power factor.

13 Claims, 8 Drawing Sheets

VALLEY-FILL POWER FACTOR CORRECTION CIRCUIT

BACKGROUND OF THE INVENTION

1. Field of the Invention

The present invention relates generally to electronic circuits, and more particularly, to power factor correction circuits for the efficient delivery of electrical power to circuit loads.

2. Description of the Related Art

An alternating current (AC) passing through an electrical load is not always in phase with the driving voltage. In the design of a power delivery circuit, one main objective is to channel as much driving power to the load as possible, with minimal power loss in the transmission process.

Figure 1:
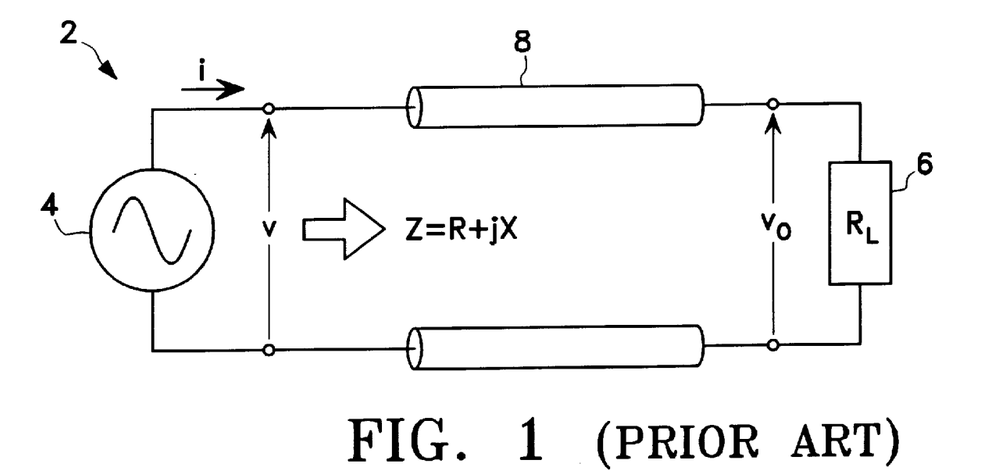
FIG. 1 is a schematic drawing of a simplified power delivery circuit.

FIG. 1 shows a simplified schematic drawing of a power delivery circuit generally designated by the reference numeral 2. The delivery circuit 2 includes an AC power supply 4 driving a load 6 through a transmission circuit 8. In this specification, the lower case alphabets are used to designate parameters that vary with time. For simplicity in illustration, suppose the voltage v generated from the power supply 4 is sinusoidal. The driving voltage v passing through the transmission circuit 8 and the load 6 generates a current i which is also sinusoidal out of the power supply 4.

Figure 2:
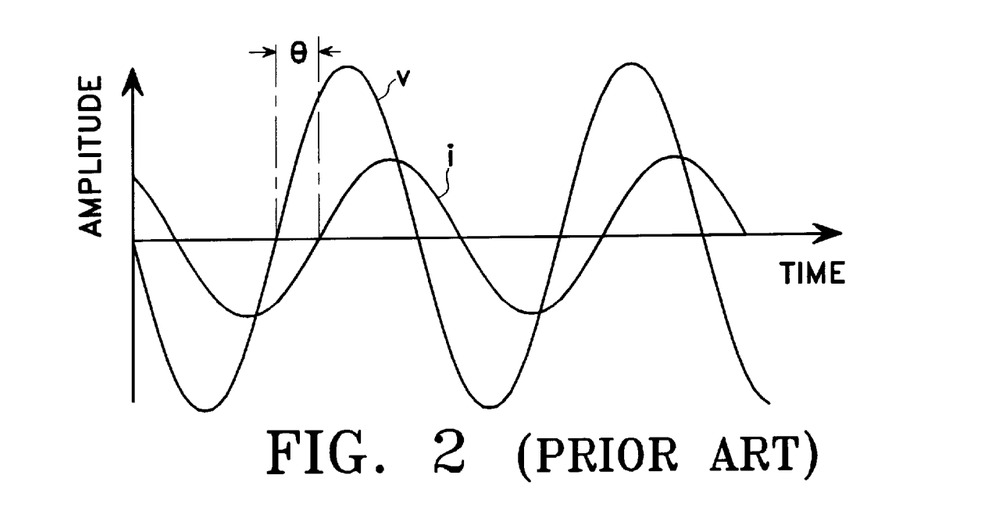
FIG. 2 is a graphical representation of the relationship between the driving voltage and the resultant current of the circuit shown in FIG. 1.

As mentioned before, the driving voltage v and the current i are not always in phase with each other. FIG. 2 shows the relationship of the voltage v and current i as a function of time. Depending on the nature of the load 6, in this example, the current i lags behind the voltage v. The phase shift is designated by a phase shift angle θ and is shown in FIG. 2. Because of the phase shift angle θ, not all the power generated by the power supply 4 is delivered to the load 6. Rather, the real portion of the total power p, that is, the actual power $P_r$ delivered to the load 6 is expressed by following algebraic expression:

$$p_r = v\ i\ \cos\theta \qquad (1)$$

while the imaginary portion of the power p, $P_i$ is represented by another algebraic expression:

$$p_i = v\ i\ \sin\theta \qquad (2)$$

where p, $p_r$ and $p_i$ are all expressed in Watts.

The imaginary power $p_i$ is not at all absorbed and utilized by the load 6. Instead, the imaginary power $p_i$ is required to flow through the reactance component X of the input impedance Z which is the impedance encountered by the power supply 4 as shown in FIG. 1. The imaginary power $P_i$ has to be withdrawn from the power supply 4 in the form of current which, when passes through conductive paths such as the transmission circuit 8 shown in FIG. 1 results in undesirable Ohmic loss.

Reference is now returned to FIG. 2. The trigonometrical cosine of the phase angle θ between the driving voltage v and the current i for the circuit 2 shown in FIG. 1 is defined as power factor γ of the power delivery circuit 2. In the design of a power delivery circuit, it is a constant design goal to adjust the power factor γ as close to unity as possible for efficient delivery of power.

Various power factor correction schemes have been proposed. Disclosed in Spangler et al., "Electronic Fluorescent Ballast using a Power Factor Correction Techniques for Loads Greater than 300 Watts," *Proceedings of the Sixth Annual Applied Power Electronics Conference,* Mar. 10–15, 1991, pages 393–399, are various filter circuits used in the past to perform the function of power factor correction. The results have been reported not to be satisfactory.

Figure 3:
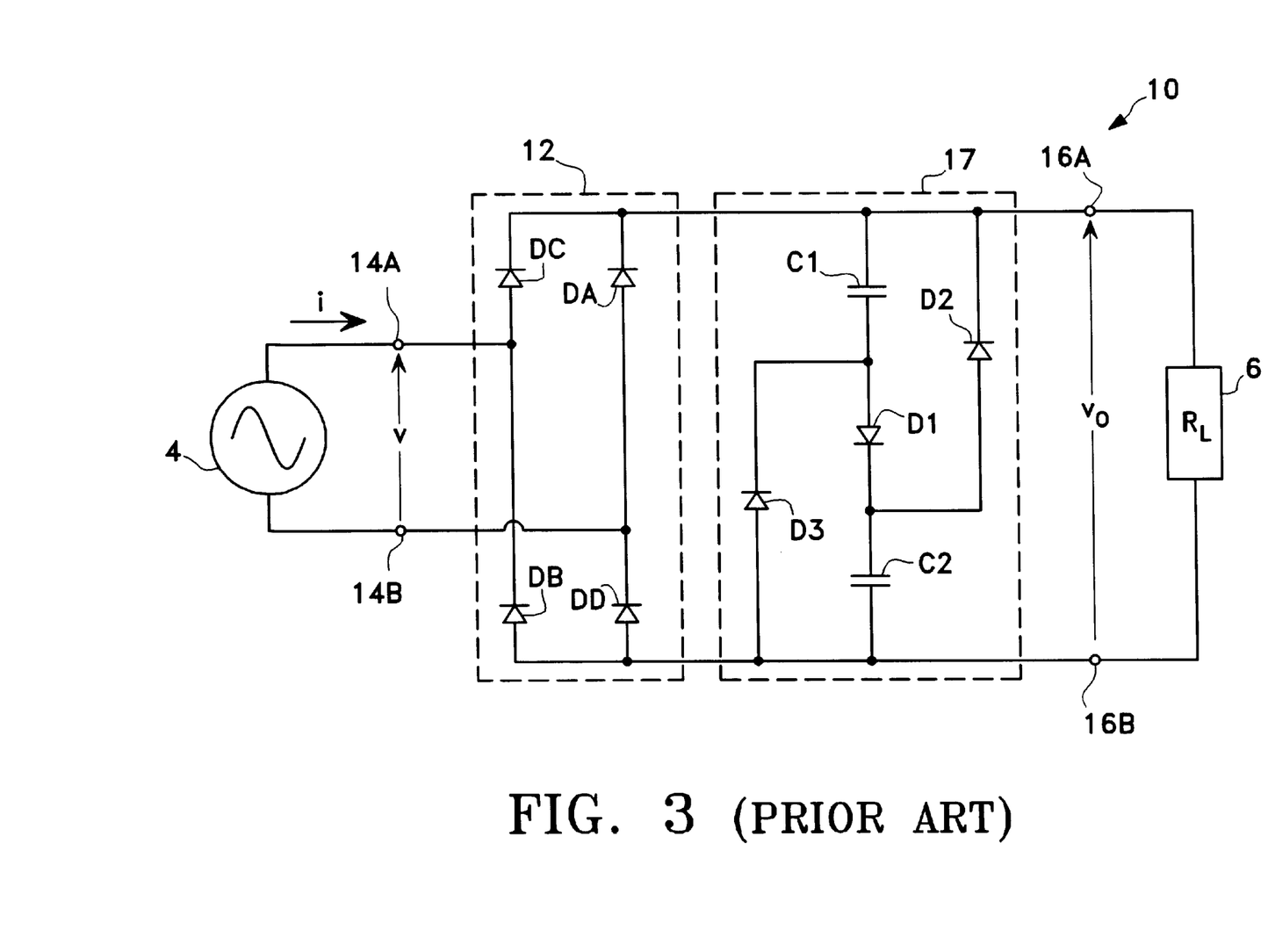
FIG. 3 is a schematic drawing of a known valley-fill circuit used for power factor correction.

Also disclosed in Spangler et el., supra (FIG. 5 of Spangler et al., supra) is a valley-fill circuit used for power factor correction and is duplicated herein for reference. The valley-fill circuit of Spangler et al., supra, is shown in FIG. 3.

The valley-fill circuit is designated by the reference numeral 10 which includes a rectifying circuit 12 having input leads 14A and 14B tied to a power supply 4. The output leads 16A and 16B of the rectifying circuit 12 are connected to a charge storage circuit 17. The charge storage circuit 17 comprises a diode D1 sandwiched between a pair of capacitors C1 and C2. There is also another diode D2 having the anode terminal connected to the cathode terminal of the diode D1. The cathode of the diode D2 is tied to the output node 16A. In a similar manner, there is yet another diode D3 having the cathode terminal connected to the anode of the diode D1. The anode of the diode D3 is attached to the other output node 16B. A load 6 is also connected across the nodes 16A and 16B.

Figure 4:
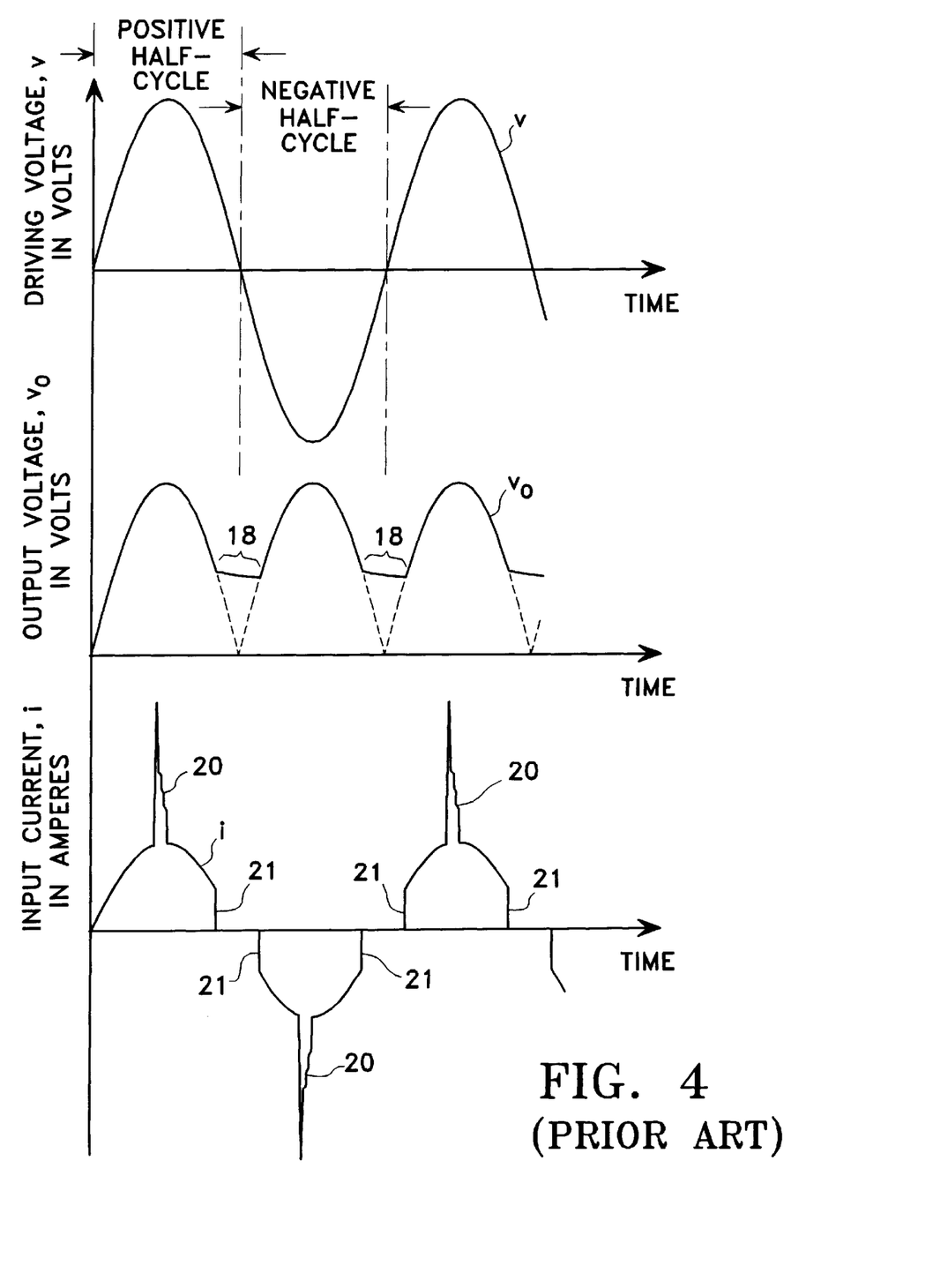
FIG. 4 is a graphical representation of the relationship between the driving voltage, the output voltage and the input current of the circuit shown in FIG. 3 in which all the parameters are aligned on the same time domain.

FIG. 4 is a timing diagram which shows the input current i and the output voltage $v_o$ in response to the driving voltage v of the circuit 10, combined in one graphical representation for the purpose of illustrating the timing relationship. To simply the analysis, the output load 6 is assumed to have a high impedance. The output voltage $v_o$ in response to the input voltage v is first explained and reference is made to FIG. 4 in conjunction with FIG. 3.

During normal operation, when the driving voltage v is at the positive half-cycle, the diodes DA and DB in the rectifying circuit 12 are turned on while the diodes DC and DD are reverse-biased and are thus non-conducting. The capacitors C1 and C2 are charged through the diode D1. Diodes D2 and D3 are reverse-biased and are thus turned off. As such, the voltage at the output nodes 16A and 16B charges up in phase with the driving voltage v and a current i flows into the circuit 10 as shown in FIGS. 3 and 4. Switching from the positive half-cycle to the negative half-cycle, the node 16A is drifting toward the negative polarity while the node 16B is rising from the negative to the positive level. However, when the difference in voltage between the nodes 16A and 16B is about a diode drop (approximately 0.7 Volt), the diodes D2 and D3 conduct and the diode D1 is turned off. The capacitors C2 and C1 discharge through the diodes D2 and D3, respectively. The discharge is an exponential decay with a time constant which depends on the RC (resistance-capacitance) time constant of the current discharge path. The voltage decay is graphically illustrated as waveform trace 18 shown in FIG. 4.

During the negative half-cycle, the diodes DC and DD in the rectifying circuit 12 are turned on, while the diodes DA and DB are shut off. Thereafter, the circuit 10 substantially operates in the same manner as described above and is not repeated in here. The result is as shown in FIG. 4.

As is well known in the art, a capacitor acts as an open circuit to a constant driving voltage. For a sluggish voltage decay 18 with a long time constant, as is the case in here because the output load 6 has a high impedance, the output voltage $v_o$ behaves as if it were at a constant level. Thus, no current is withdrawn from the voltage supply 4 and the input current i during the period of output voltage decay 18 is zero as shown in FIG. 4. As a consequence, the current waveform for the input current i is truncated at the phase angle near the voltage polarity transitions designated by the reference numeral 21. The current spikes identified by the reference numeral 20 come chiefly from charging of the capacitors C1 and C2 after the time of the voltage decay 18. As mentioned before, a sluggish voltage decay 18 with a long time constant renders the output voltage $v_o$ to behave as if it were at a constant voltage level. Accordingly, the capacitors C1 and C2 act as a virtual short circuit to any sudden changes of output voltage $v_o$ deviated from the aforementioned constant voltage level. Consequently, there are sudden withdrawals of current i from the power supply 4 manifesting themselves as current spikes 20.

Figure 5:
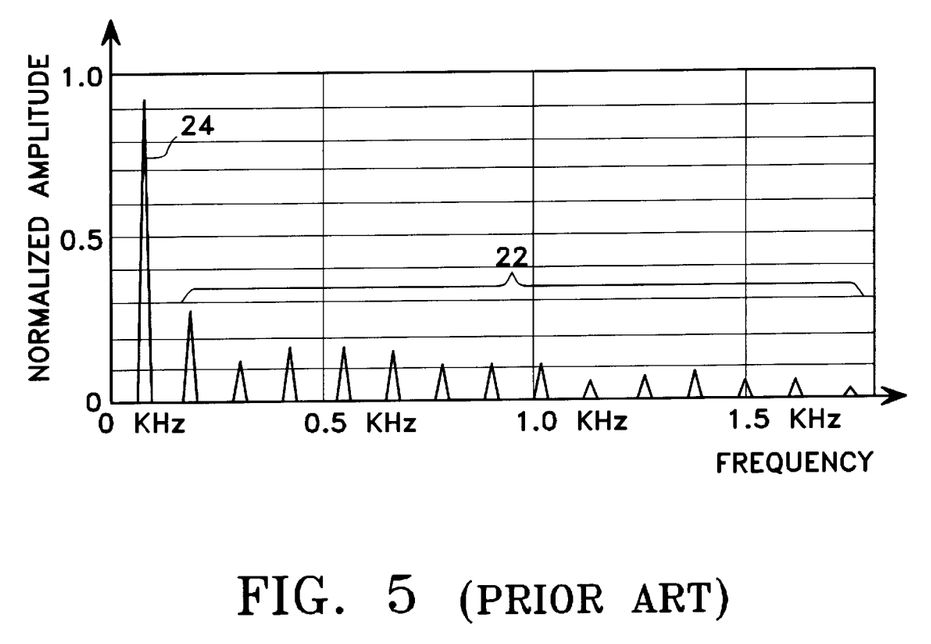
FIG. 5 is a graphical representation of the Fourier transform in the frequency domain from the time domain of the current waveform shown in FIG. 4.

As is also known in the art, the current waveform i shown in FIG. 4, irregular in shape as it appears, can be broken down into its constituent sinusoidal harmonics under the Fourier analysis. For each sinusoidal harmonic of the current i, power delivered $p_r$ and the power factor $\gamma$ can be computed by the equations as described above. FIG. 5 shows the Fourier harmonics of the waveform of the input current i displayed in the frequency domain. There are multiple orders of harmonics 22 after the fundamental harmonic 24. Aggregating the power delivered $p_r$ and the power factor $\gamma$ for all the harmonics constitute respectively the overall power delivered $p_r$ and the main power factor $\gamma$ of the power delivery circuit 2. However, the higher order harmonics 22 have low power factors $\gamma$ which significantly degrade the overall power factor of the circuit 2. It is found that the performance of the circuit 2 is marginally close to IEC (International Electronic Conference) specifications under limited conditions, but not under general conditions. The operating results of the circuit 2 is summarized in Table 5 of Spangler et al., supra, which results will further be discussed in this specification.

Wide ranges of household appliances and industrial machines are driven by AC power. Power delivery circuits with high power factors not only conserve energy in general but also increase reliability and extend the lives of the these electrical products. Accordingly, there has been a long-felt need to provide power delivery circuits meeting the aforementioned criteria.

SUMMARY OF THE INVENTION

It is accordingly the object of the invention to provide a power delivery circuit with a high power factor in compliance with the IEC standards, thereby reducing power consumption, improving reliability and extending electrical circuit lives. The objective of providing such features in the power delivery circuit at low manufacturing cost is also sought.

The power delivery in accordance with the invention includes a rectifying circuit connected to a charge storage circuit. There is a voltage doubler circuit disposed between the rectifying circuit and the charge storage circuit. A low impedance circuit is inserted between the voltage doubler circuit and the rectifying circuit. In addition, another low impedance circuit is also inserted in the charge storage circuit. The voltage doubler circuit performs the duty of filling up the normally truncated output current waveform. The low impedance circuits fulfill the functions of attenuating any spiking glitches. As arranged, the input current waveform can be maintained with substantially less distortion resulting in a Fourier transform in compliance with the IEC specification. The power delivery circuit of the invention achieves a high power factor capable of delivering power from a power source to a circuit load with less Ohmic loss and thus curtails wasteful heat dissipation.

These and other features and advantages of the invention will be apparent to those skilled in the art from the following detailed description, taken together with the accompanying drawings, in which like reference numerals refer to like parts.

DETAILED DESCRIPTION OF THE INVENTION

Figure 6:
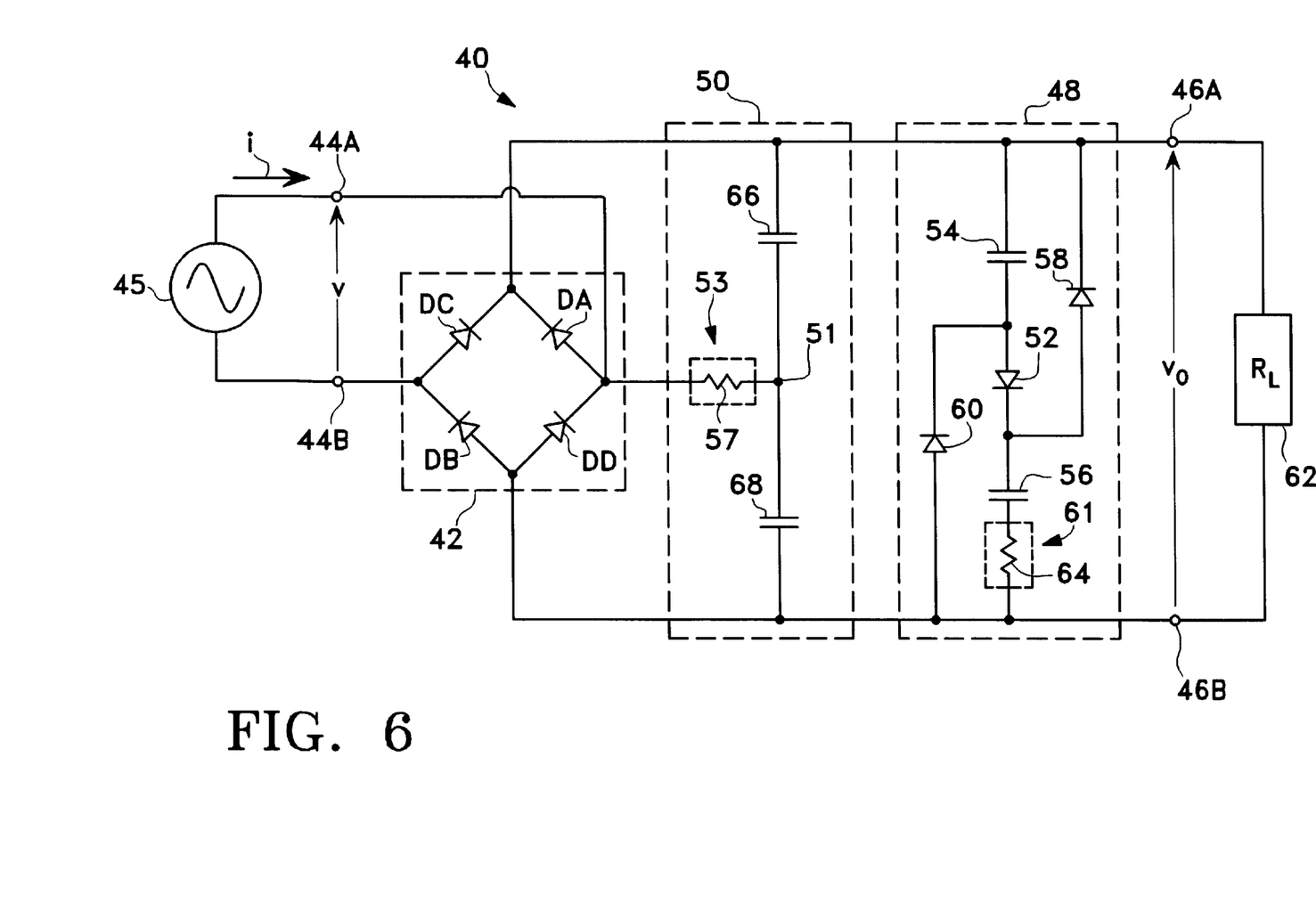
FIG. 6 is the preferred embodiment of the invention.

Reference is now directed to FIG. 6 which shows the preferred embodiment of the invention. The power correction circuit of this embodiment is generally signified by the reference numeral 40 which includes a rectifying circuit 42 having input leads 44A and 44B tied to a power supply 45. The output leads 46A and 46B of the rectifying circuit 42 are connected to a charge storage circuit 48.

The charge storage circuit 48 includes a first diode 52 sandwiched between a pair of capacitors 54 and 56. There is also a second diode 58 having the anode terminal connected to the cathode terminal of the first diode 52. The cathode of the second diode 58 is tied to the output node 46A. In a similar manner, there is yet another diode, called the third diode 60 having the cathode terminal connected to the anode of the first diode 52. The anode of the third diode 60 is attached to the other output node 46B.

Inside the charge storage circuit 48, the capacitor 56 is connected to the output terminal 46B through a low impedance circuit 65. It this embodiment, the low impedance circuit 65 is a damping resistor 64. The low impedance circuit 65 serves a special function which will be explained later in this specification.

Disposed between the charge storage circuit 48 and the rectifying circuit 42 is a voltage doubler circuit 50. The voltage doubler circuit 50 includes a capacitor 66 tied to the output node 46A and a common node 51, and another capacitor 68 connected to the output node 46B and the common node 51. Between the common node 51 and the input lead 44A is also another low impedance circuit 53. In this embodiment, the low impedance circuit 53 is implemented in the form of a damping resistor 57.

A load 62 is also connected across the output nodes 46A and 46B. For simplicity in analysis, the load 62 is assumed to have a high impedance.

Figure 7:
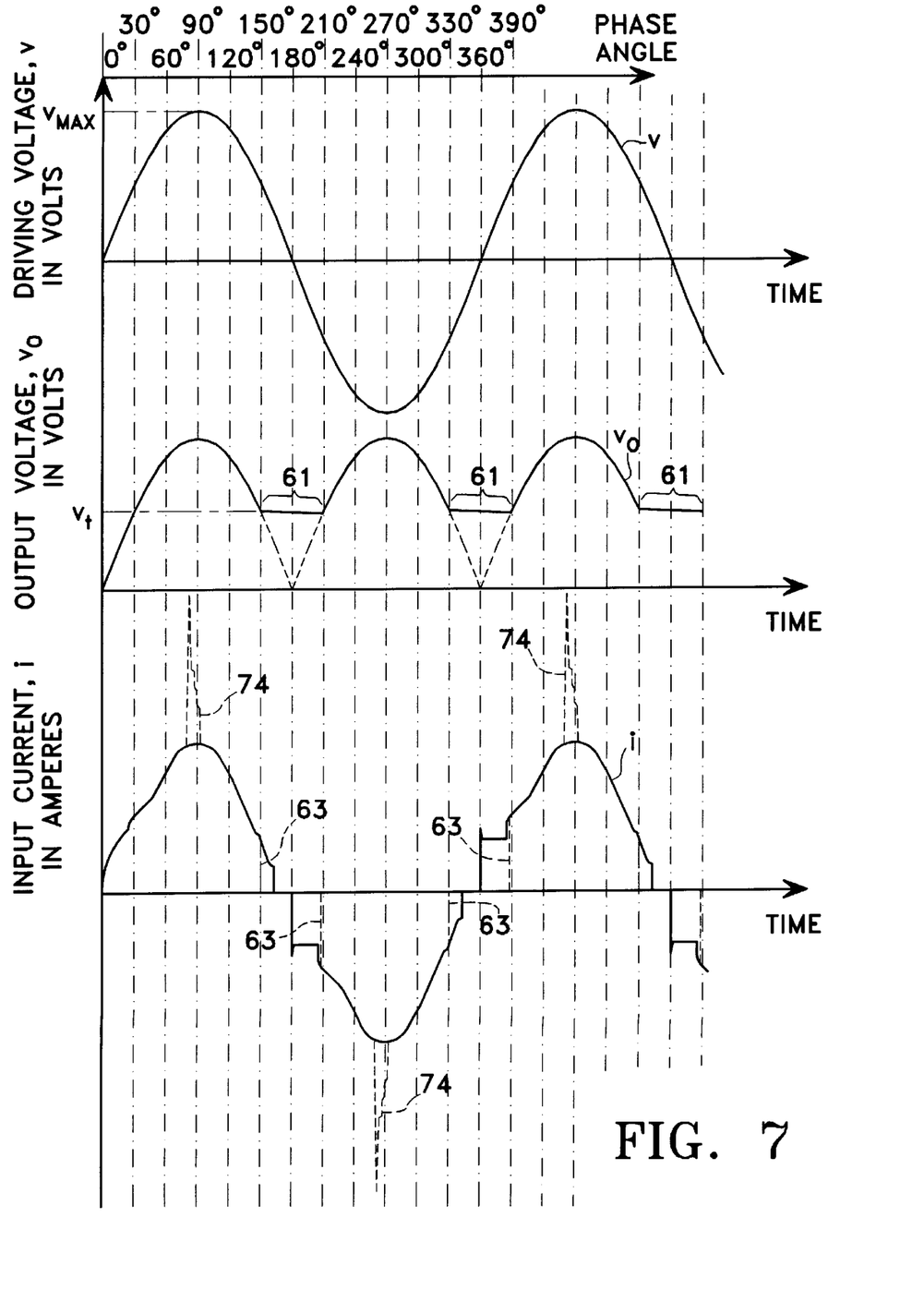
FIG. 7 is a graphical representation of the relationship between the driving voltage, the output voltage and the input current of the circuit of the preferred embodiment shown in FIG. 6 wherein all parameters are aligned on the same time domain.

FIG. 7 is a graphical representation of the output voltage $v_o$ and the input current i of the circuit 40 in response to the driving voltage v of the power supply 45. The three parameters, v, $v_o$ and i are all aligned in the same time domain to show the relative timing relationship. Furthermore, to facilitate explanation, phase angles are aligned on the top of the graph shown in FIG. 7.

Reference is now directed to FIG. 7 in conjunction with FIG. 6. The description of the operation of the circuit 40 can easier be understood by first assuming the voltage doubler circuit 50 is nonexistent. The effect and function of the voltage doubler circuit 50 in the circuit 40 is thereafter explained.

During normal operation, when the driving voltage v is at the positive half-cycle from 0° to 180°, current i passes through the diode DA and the diode DB of the rectifying circuit 42. There is no current conduction through the diodes DC and DD because they are reverse-biased. The capacitors 54 and 56 are charged through the first diode 52. The second and third diodes 58 and 60 are reverse-biased and are thus turned off. As such, the voltage at the output nodes 46A and 46B charges up in phase with the driving voltage v. Consequently, a current i flows into the circuit 10 as shown in FIGS. 6 and 7. Approaching the top of the positive half-cycle at the phase angle 90°, the driving voltage v starts to decrease in amplitude and drifts toward the negative half-cycle. That is, the voltage potential at the node 46A migrates toward the negative polarity while the node 46B rises from the negative to the positive level. However, when the difference in voltage is about a diode drop (approximately 0.7 Volt) between the nodes 46B and 46A, the second and third diodes 58 and 60 conduct and the first diode 52 turns off. The capacitors 54 and 56, previously stored with charges during the phase angles from 0° to 150°, discharge through the second and third diodes 58 and 60, respectively. The discharge is an exponential decay with a time constant which depends on the RC (resistance-capacitance) time constant of the current discharge path. The voltage decaying is graphically illustrated as waveform trace 61 shown in FIG. 7.

During the negative half-cycle from the phase angles 180° to 360°, the diodes DC and DD in the rectifying circuit 42 are turned on, while the diodes DA and DB are shut off. Thereafter, the circuit 40 substantially operates in the same manner and the operation repeats itself as described above and the result is shown in FIG. 7.

As mentioned before, a capacitor acts as an open circuit to a constant driving voltage. For a sluggish voltage decay 61 with a long time constant, as is the case in here because the output load 62 has a high impedance, the output voltage $v_o$ behaves as if it were at constant level. Thus, no current i would have been withdrawn from the voltage supply 45 and the input current i during the period of output voltage decay 18 (from phase angles 150° to 210°) would have been zero. That is, the current waveform for the input current i would have been truncated around polarity transitions designated by the reference numeral 63, were it not for the implementation of the voltage doubler circuit 50. Phrased differently, if the voltage doubler circuit 50 were nonexistent, the waveform of the input current i would have been truncated at the phase angles from 150° to 210°, and from 330° to 390°, and so on. However, the existence of the voltage doubler circuit 50 alters the operational dynamics of the circuit 40.

For illustration, attention is directed to the operation of the circuit 40 during the phase angles from 150° to 210°. As described before, while the storage capacitors 54 and 56 are discharging respectively through the second and third diodes 60 and 58, no current i is drawn from the power supply 45 by the storage circuit 48 because the output nodes 46A and 48B coupled with the high impedance load 62 act as if the nodes 46A and 48B were electrically open. However, the same cannot be said of the voltage doubler circuit 50 during this phase period.

To begin with, the capacitive values of the doubler capacitors 66 and 68 are normally orders of magnitude smaller than the corresponding values of the first and second capacitors 54 and 56. Thus, the output voltage $v_o$ is not much affected by the insertion of the voltage doubler capacitors 66 and 68. During the positive cycle from the phase angles 30° to 150° for example, the potential difference between the nodes 46A and 46B are constant at a value illustrated by the waveform trace 61 at $v_t$ as shown in FIG. 7. However, ignoring the low voltage drop across the low impedance circuit 53, the potential of the common node 51 varies from $v_t$ to zero during the phase angle range 150° to 180°, and from zero to $-v_t$ during the phase angle range from 180° to 210°. Thus, during the phase angle range from 150° to 180°, the capacitor 68 fully charges up while the capacitor 66 also charges up but at a slower pace. Current is drawn from the power supply 45 during this charging process. As a consequence, the truncated portion 63 of the waveform of the input current i is approximately patched up as shown in FIG. 7.

From the phase angle range from 180° to 210°, the common node 51 drifts in potential from zero to $-v_t$, both the capacitors 66 and 68 charge up. The capacitor 66 charges up at a faster pace this time because it is under a wider potential difference. Again, as a result, the truncated portion 63 of the waveform of the input current i is approximately patched up during the phase angle range from 180° to 210° as shown in FIG. 7.

Figure 8:
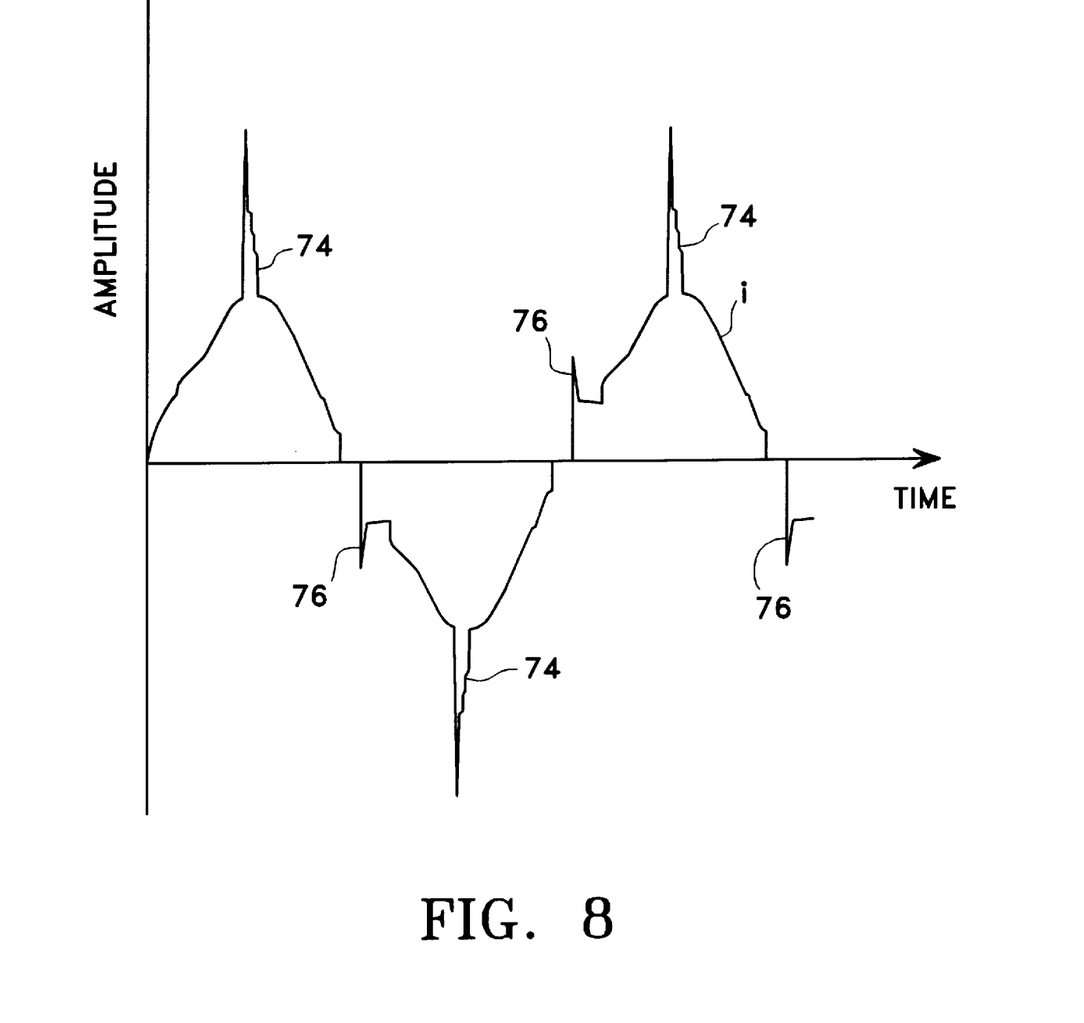
FIG. 8 is a graphical representation of the input current response of the circuit of the preferred embodiment shown in FIG. 6 but with the low power impedance circuits removed.

The implementation of the low impedance circuit 53 is to dampen the glitches at the waveform discontinuities of the current i. Similarly, the insertion of the other low impedance circuit 61 is to dampen the current spikes 74 that would have been occurred at and around the phase angles 90°, 180° and etc., had it not for the presence of the circuit 65. The low impedance circuits 53 and 65 minimally affect the normal operation of the circuit 40 because of their relative small values. Without the low impedance circuits 53 and 65, the resultant waveform for the input current i would have been similar to that shown in FIG. 8 in which the spikes 74 and 76 are more eminent. The spikes 74 and 76 have low higher order harmonic contents and thus only slightly affect the overall power factor γ of the entire circuit 40. For these reasons, the low impedance circuits 51 and 61 can be dispensed with, if the slightly lower power factor γ of the circuit 40 is acceptable.

Figure 9:
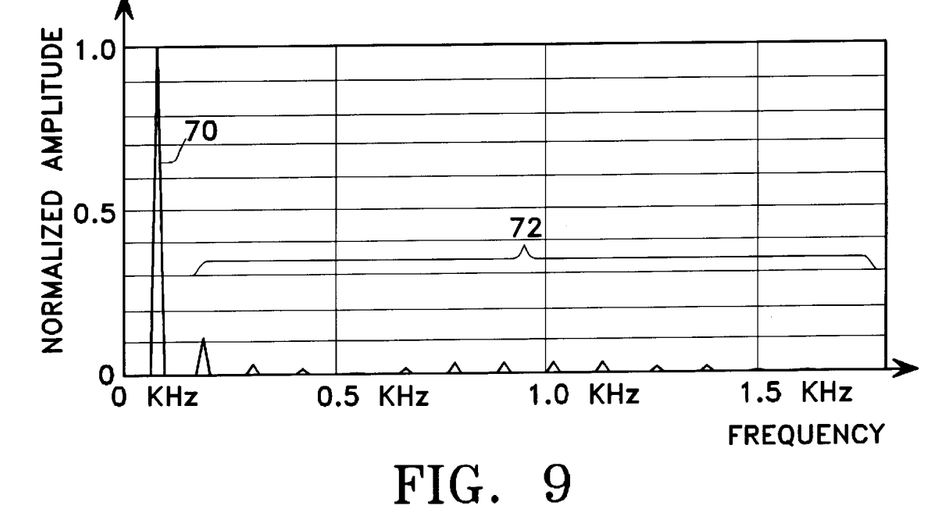
FIG. 9 is a graphical representation of the Fourier transform in the frequency domain from the time domain of the current waveform shown in FIG. 7.
Figure 10:
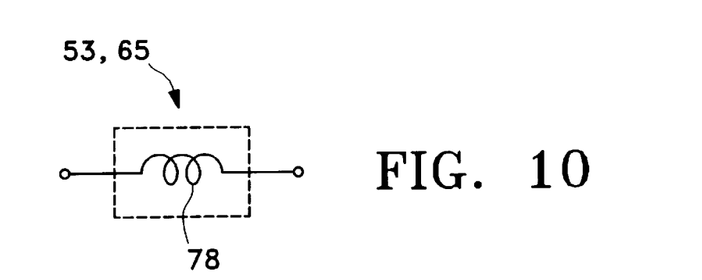
FIG. 10 is another variation of implementation of the low impedance circuit shown in FIG. 6.

FIG. 9 shows the Fourier components of the input current i shown in FIG. 7. As can be seen, the fundamental frequency component 70 is clearly eminent while the other higher order harmonics 72 are significantly suppressed.

Again, as mentioned before, for each sinusoidal harmonic of the current i, power delivered $p_r$ and the power factor γ can be computed by the equations as described above. The aggregate power delivered $p_r$ and the power factor γ of all the harmonics constitute the overall power delivered $p_r$ and the power factor γ of the power delivery circuit 40. However, with the suppressed higher order harmonics as shown in FIG. 9 and thus contribute less in degrading the overall power factor γ, the circuit 40 as described above can achieve a power factor γ in excess of 0.98.

The valley-fill power correction circuit 40 in accordance with the invention generates the undesirable higher order harmonics substantially below the limits set by the IEC specifications. The analytical results in conjunction with the corresponding results for the prior art valley-fill circuit 10 shown in FIG. 3 are tabulated as follows for comparison:

| Harmonic | 2nd | 3rd | 5th | 7th | 9th | 11th | 13th | THD |
|---|---|---|---|---|---|---|---|---|
| IEC Limits (in % of the Fundamental Harmonic) | 2.00 | 27.00 | 10.00 | 7.00 | 5.00 | 3.00 | 3.00 | 32.28 |
| Invention | 0.42 | 9.44 | 1.56 | 0.58 | 0.55 | — | — | 9.61 |
| Prior Art | 0.33 | 29.25 | 4.36 | 6.41 | 11.78 | 7.76 | 2.49 | 33.41 |

THD (Total Harmonic Distortion) is a parameter used to gauge the performance of a power factor correction circuit and is defined in Spangler et al., supra. As shown in the above table, the prior art valley-fill circuit 10 fails the THD under normal operating conditions. Furthermore, the prior art circuit 10 does not meet the IEC specifications at the 3rd, 9th and the 11th harmonics. In contrast, the inventive circuit 2 exceeds the IEC limits in all aspects.

Figure 11:
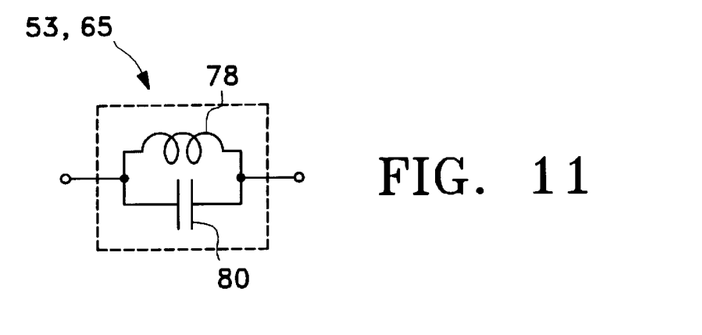
FIG. 11 is yet another variation of implementation of the low impedance circuit shown in FIG. 6.

Finally, other changes are possible within the scope of the invention. For example, in the embodiment as described, the low impedance circuits 53 and 61 are implemented in the form of damping resistors 57 and 64, respectively. Each of the low impedance circuits 53 and 61 can well assume another form such as an inductor 78 shown in FIG. 11, or as a parallel combination of an inductor 78 and a capacitor 80 as shown in FIG. 12. It will be understood by those skilled in the art that these and other changes in form and detail may be made therein without departing from the scope and spirit of the invention.

What is claimed is:

1. A power factor correction circuit comprising:
   a rectifying circuit having input terminals and output terminals;
   a storage circuit connected to said output terminals, said storage circuit includes a first diode disposed between first and second capacitors, said storage circuit further including second and third diodes, each of said second and third diodes having one end connected to one of said capacitors and another end connected to one of said output terminals, each of said first and second capacitors includes two terminals, one terminal of each of said first and second capacitors being connected to one of said output terminals, the anode of said second diode being connected to the cathode of said first diode, the cathode of said second diode being connected to one of said output terminals, the cathode of said third diode being connected to the anode of said first diode, and the anode of said third diode being connected to the other of said output terminals, the other terminal of said second capacitor being connected to one of said output terminals through a low impedance circuit; and
   a voltage doubler circuit including third and fourth capacitors, each of said third and fourth capacitors includes two terminals, one terminal of each of said third and fourth capacitors being connected to one of said output terminals and the other terminal of each of said third and fourth capacitors being connected to a common node which is connected to one of said input terminals.

2. The power factor correction circuit as set forth in claim 1 wherein said low impedance circuit is a resistor.

3. The power factor correction circuit as set forth in claim 1 wherein said low impedance circuit is an inductor.

4. The power factor correction circuit as set forth in claim 1 wherein said low impedance circuit is an inductor and a fifth capacitor connected in parallel.

5. The power factor correction circuit as set forth in claim 4 wherein said common node is connected to one of said input terminals through a low impedance circuit.

6. The power factor correction circuit as set forth in claim 5 wherein said low impedance circuit is a resistor.

7. The power factor correction circuit as set forth in claim 5 wherein said low impedance circuit is an inductor.

8. The power factor correction circuit as set forth in claim 5 wherein said low impedance circuit is an inductor and a fifth capacitor connected in parallel.

9. A power factor correction circuit comprising:
   a rectifying circuit having input terminals and output terminals;
   a storage circuit connected to said output terminals, said storage circuit includes a first diode disposed between first and second capacitors, said storage circuit further including second and third diodes, each of said second and third diodes having one end connected to one of said capacitors and another end connected to one of said output terminals, each of said first and second capacitors includes two terminals, one terminal of each of said first and second capacitors being connected to one of said output terminals, the anode of said second diode being connected to the cathode of said first diode, the cathode of said second diode being connected to one of said output terminals, the cathode of said third diode being connected to the anode of said first diode, and the anode of said third diode being connected to the other of said output terminals; and
   a voltage doubler circuit having third and fourth capacitors, each of said third and fourth capacitors includes two terminals, one terminal of each of said third and fourth capacitors being connected to one of said output terminals and the other terminal of each of said third and fourth capacitors being connected to a common node which is connected to one of said input terminals, said common node being connected to one of said input terminals through a low impedance circuit.

10. The power factor correction circuit as set forth in claim 9 wherein said low impedance circuit is a first low impedance circuit, said power factor correction circuit further comprising a second low impedance circuit, said one terminal of said second capacitor being connected to one of said output terminals through said second low impedance circuit.

11. The power factor correction circuit as set forth in claim 10 wherein said first and second low impedance circuits are selected from a group consisting of a resistor, an inductor and a combination of an inductor and a fifth capacitor connected in parallel.

12. The power factor correction circuit as set forth in claim 9 wherein said one terminal of said second capacitor is connected to one of said output terminals through a low impedance circuit.

13. The power factor correction circuit as set forth in claim 12 wherein said low impedance circuit is selected from a group consisting of a resistor, an inductor and a combination of an inductor and a fifth capacitor connected in parallel.

* * * * *